United States Patent
Chowdhury (10) Patent No.: US 9,788,373 B1
(45) Date of Patent: Oct. 10, 2017

(54) LED LIGHT WITH POWER SWITCH CONTROLLED COLOR TEMPERATURE

(71) Applicant: Mohammed Chowdhury, Saint Paul, MN (US)

(72) Inventor: Mohammed Chowdhury, Saint Paul, MN (US)

( * ) Notice: Subject to any disclaimer, the term of this patent is extended or adjusted under 35 U.S.C. 154(b) by 0 days.

(21) Appl. No.: 15/201,482

(22) Filed: Jul. 3, 2016

(51) Int. Cl.
  *H05B 41/16* (2006.01)
  *H05B 41/24* (2006.01)
  *H05B 33/08* (2006.01)

(52) U.S. Cl.
  CPC ..... *H05B 33/0815* (2013.01); *H05B 33/0812* (2013.01); *H05B 33/0857* (2013.01)

(58) Field of Classification Search
  CPC ............ H05B 33/0815; H05B 33/0812; H05B 33/0857
  USPC ................................. 315/250, 192, 122, 224
  See application file for complete search history.

(56) References Cited

U.S. PATENT DOCUMENTS

| | | | |
|---|---|---|---|
| 4,322,632 A | 3/1982 | Hart et al. | |
| 4,480,197 A | 10/1984 | Hollaway | |
| 4,540,984 A | 9/1985 | Waldman | |
| 4,634,957 A | 1/1987 | Hollaway | |
| 4,695,739 A | 9/1987 | Pierce | |
| 4,767,968 A | 8/1988 | Geanous et al. | |
| 4,777,384 A | 10/1988 | Altenhof et al. | |
| 5,030,890 A | 7/1991 | Johnson | |
| RE35,220 E | 4/1996 | Johnson | |
| 6,016,038 A | 1/2000 | Mueller et al. | |
| 6,685,339 B2 | 2/2004 | Daughtry et al. | |
| 6,700,333 B1 | 3/2004 | Hirshi et al. | |
| 7,288,902 B1 | 10/2007 | Melanson | |
| 7,845,823 B2 | 12/2010 | Mueller et al. | |
| 8,143,807 B2 | 3/2012 | Hsieh et al. | |
| 8,162,517 B2 | 4/2012 | Lee | |
| 8,278,827 B2 | 10/2012 | Ku et al. | |
| 8,441,202 B2 | 5/2013 | Wilson et al. | |
| 8,633,650 B2 | 1/2014 | Sauerlaender | |
| 8,736,183 B2 | 5/2014 | Chao | |
| 8,836,243 B2 | 9/2014 | Eisele et al. | |
| 9,119,245 B1 | 8/2015 | Yang | |
| 2012/0242247 A1 | 9/2012 | Hartmann et al. | |
| 2013/0063035 A1* | 3/2013 | Baddela et al. | H05B 33/086 315/192 |
| 2013/0200814 A1 | 8/2013 | Chen et al. | |
| 2014/0210357 A1 | 7/2014 | Yan et al. | |
| 2015/0062892 A1 | 3/2015 | Krames et al. | |

* cited by examiner

*Primary Examiner* — Daniel D Chang
(74) *Attorney, Agent, or Firm* — Albert W. Watkins (57) ABSTRACT

A voltage monitor and LED color controller circuit detects wall light dimmer and wall light switch on/off status based upon the output of an LED driver located downstream from the wall light dimmer and switch. Various switch time delays will produce several different outputs from an LED array, enabling wall dimmer switch control of intensity and Correlated Color Temperature (CCT). In addition, a preferred embodiment will first turn on in a default mode with a spectrum that is substantially devoid of violet wavelengths and provides only nominal amounts of blue light, to avoid undesirable disruption of circadian rhythm. In other embodiments, various controls may be provided that permit custom light therapy for various purpose and benefit.

22 Claims, 7 Drawing Sheets

LED LIGHT WITH POWER SWITCH CONTROLLED COLOR TEMPERATURE

BACKGROUND OF THE INVENTION

1. Field of the Invention

The present invention pertains generally to the field of illumination, and more particularly to electrical illumination systems that may be selectively controlled intuitively and with prior art controls to provide variations in both intensity and color temperature.

2. Description of the Related Art

Humans have many gifts that are relatively unique in the animal kingdom, particularly when considered in aggregate. Among these are the abilities to function through many hours in a twenty-four hour day, and the ability through many diverse and sometimes complex implements and contrivances to also exert great control over our environment. As we have used these implements to satisfy needs and desires, one notable and almost universally demanded application is the provision of illumination. A typical adult may spend two-thirds of a twenty-four hour day awake, or about sixteen hours. In contrast, the average time for natural illumination from the sun is only slightly more than half of that same twenty four hour period, or slightly more than twelve hours including the partially illuminated time of dawn and dusk. This means that there may exist an average of about three and a half hours of time awake for which there is no or only very minimal illumination provided by the sun.

While humans have many gifts, there are many creatures in the animal kingdom that have far better eyesight through the night hours. In fact, the productivity of many humans is severely inhibited without some form of additional light during the night. For many centuries, humans relied heavily upon combustible matter to meet this need, quite simply burning things from their surroundings to provide desired illumination. Based upon early cave drawings and the like, it is thought that early humans in pre-recorded time burned wood and other plant matter in simple fires to both cook and provide illumination during the otherwise darkness of the night. This practice evolved over time into much more refined contrivances such as lanterns that burned various oils and candles made from various waxy materials.

The light from these combustible sources is referred to as thermal radiation, and is sometimes described by and known as black body radiation. One way of describing light that is emitted from a source, which is in common use today, is referred to as the color temperature of the light. When an ideal black body radiates light, the hue or color of the light changes with changes in the temperature of the black body radiator. As the light source gets hotter, the color of the light will shift towards the white or blue, while a lower temperature will yield a more yellow or reddish hue. As one simple example, when a blacksmith heats iron in a furnace, the iron will first turn "red hot", but if heated to an even higher temperature, the iron will turn progressively to a more yellow color and even "white hot". Likewise, embers from a wood fire may glow a red color, burning slowly at a relatively lower temperature. In contrast, the flames from an open wood fire may appear yellow. If that same wood fire is fed with sufficient oxygen, such as in a blast furnace or sometimes at the tips of the flames, the flames may even turn to a blue hue.

The unit of measurement for color temperature is degrees Kelvin. Color temperatures in the range of approximately 6,000 degrees Kelvin have a hue very similar to bright, midday sun. However, as the sun rises and sets, the characteristically more reddish appearance will lower the color temperature to less than 2,000 degrees Kelvin. As may be apparent then, a very hot open wood fire may be somewhere between that of daylight and sunset, while as the fire burns down to embers the color will shift to that of the final minutes of sunset.

About a century and a half ago, which is a very small amount of time when compared to recorded history and even smaller when compared to postulated existence of humans, electricity and electrical machinery began to come into more general use and acceptance, permitting various electrical lamps to replace sources of light that relied upon combustible materials. While it may have been debated in the early days of electricity whether electrical lights were safer or better than combustion lights, in a matter of only a few decades, better electrical machinery was developed that both lowered the cost of illuminating with electricity and also greatly improved the safety of such illumination sources over the older combustible sources.

One of the characteristics of these early electrical lights that we now refer to as incandescent lamps is the fact that they rely upon heat as the source of visible radiation, just as the combustible materials do. The heat source, typically a tungsten filament, operates at a temperature of around 2,400 degrees Kelvin. This temperature is significantly lower than the color temperature of the midday sun, instead corresponding to the light of the early morning and later evening. Consequently, the light from an incandescent lamp is generally both dimmer and more yellow than that of broad daylight. In fact, these incandescent lights create an ambience very similar to that of a wood fire relied upon by our distant ancestors. However, since these lights are very hot, they also dissipate a large amount of heat to their surroundings, just as the combustible materials do. This means they are not very efficient at converting electricity to light, and instead also create much waste heat.

Only a few decades after the introduction and early use of the incandescent lights, electric lights that produced light by other means known as luminescence were successfully commercially introduced. A particularly noteworthy type of such lights is known of as the gas discharge lamp, specific exemplary instances of which are known of as fluorescent lights, neon lights, and mercury vapor lamps. In these types of lamps, electricity excites gas contained in the light bulb causing it to emit light. Since these lights do not produce light from a heat source, the light emissions are often in very narrow bands of wavelengths or colors that are dependent upon the mixture of gasses and pressures used in the design and construction of the light. Since heat is not required to produce light, and instead the ionization of the gas is the source, there is typically less energy lost in the process. This in turn means these lights are often much more efficient at producing light than the incandescent lamps and other heat sources, meaning they require less electricity to operate. Finally, many of these gas discharge lights can also be designed for substantially longer operation without replacement than incandescent bulbs. Consequently, in the last half century, and particularly in the last few decades, these gas discharge lights have found very wide application, including wide area illumination such as street and yard lights, home and commercial applications through the implementation of the tubular fluorescent lighting, and through the advent of smaller compact fluorescent lights the direct replacement of many incandescent lights in many household and work fixtures.

While these gas discharge lamps offer many benefits, they are not without limitation. One such limitation is a result of the narrow bands of wavelengths emitted by the gas ionization. Since the human eye is sensitive to many different wavelengths, or colors, of light, illumination at only one or a few wavelengths can cause visual disturbance. In contrast, a thermal light source or ideal black body radiator may generally provide nearly perfect color rendering to humans across a full spectrum of wavelengths. As an example, many street lights use either high pressure mercury or sodium vapor lamps. While these lamps are quite efficient at generating visible light, the wavelengths of emitted light fall in only a few very narrow bands. As a result, they are often perceived as being "eerie" by many persons. As an example, mercury vapor street lamps tend to make a healthy person appear "bloodless" due to the lack of the red hues in the light. Since the light emitted from these lights does not distribute across the spectrum the way an incandescent lamp or other heat source does, a Correlated Color Temperature, or simply CCT, is assigned that correlates the light emission to the closest color temperature of a black body radiator.

To overcome this limitation regarding color rendition and color temperature, various fluorescent materials have been identified and developed that may be incorporated into these gas discharge lamps. Fluorescent materials, which may sometimes be referred to as phosphors, convert some of the narrow bands of light into different wavelengths, allowing designers to shift the hue of the light and also broaden the range of wavelengths emitted by the light. These fluorescent lights have been designed for and accepted in nearly every location, and are sometimes very much preferred over incandescent lights.

Another limitation has been the dimming of fluorescent lights. At some level of emission, the gas discharge will extinguish. This energy level is often higher than that required in an incandescent bulb, meaning the fluorescent light must be kept at a higher brightness level than an incandescent bulb. Furthermore, with an incandescent bulb, the typical electronic circuit used to accomplish the dimming, such as a TRIAC or SCR that simply blocks a part of the voltage cycle, will not work properly with a fluorescent bulb. This means that for many years, it was not possible to dim fluorescent bulbs using ordinary and standard light dimmers. Once again, and particularly recently, various artisans have developed special electronic circuits that allow some fluorescent bulbs to be dimmed using standard light dimmers.

Nevertheless, fluorescent lights continue to suffer from another very notable deficiency. When an incandescent light is dimmed, not only is there a decrease in the amount of light emitted, commonly measured in Lumens, but there is also a shift in the color temperature. This is from the reduced energy input causing the filament to operate at a lower temperature. This shift in the color temperature will be perceived as a shift more towards the red, which resembles that of the setting sun or of the dying embers of a fire. Because the phosphors of a fluorescent light bulb are what determine the wavelength of emitted light, there is simply no opportunity for the fluorescent light to emulate this shift in color temperature that occurs with incandescent bulbs and naturally in a dying fire or setting sun.

Through this evolution in lighting, there has also been a gradual evolution in the science of understanding human cycles that vary with periods of day and night. Some of these may simply be referred to as diurnal or nocturnal cycles, where light and darkness are known to trigger various events. However, a more elemental or fundamental cycle, commonly referred to as the circadian cycle, has also been identified and extensively studied in humans and animals.

The circadian cycle is an approximately twenty-four hour cycle that in humans involves rhythmic variations in the production of various powerful hormones in the body, changes in blood pressure, mental alertness, body temperature, and even reaction time. By definition, a circadian cycle must be endogenous, meaning it will be sustained with or without daily exposure to daytime and nighttime, and it must be entrained to the local environment by external cues, such as light and temperature. Consequently, when a person travels to a distant location in a very different time zone, the endogenous nature of the circadian cycle means that the person will still want to sleep on their home schedule. However, over a period of days or weeks, the person will receive enough cues from the new location, commonly referred to as zeitgebers, to shift their circadian cycle and become entrained in the timing of the new location. The interim period can be extremely disruptive, and is common among those who travel rapidly and distantly around the earth. Consequently, it is commonly referred to as "jet lag".

More recently, unintended entraining of the circadian rhythm has been discovered to occur from zeitgebers such as the intensity and color temperature of indoor lights that a person is exposed to. So, for exemplary purposes, working late hours in front of a modern computer screen having a very high Correlated Color Temperature (CCT), shifted to the white and blue end of the spectrum, can confuse and disrupt a person's circadian rhythm. The person's body will sooner or later react to the high CCT as though the person is being exposed to midday sun, and this signal will then lead to a shift in the person's circadian rhythm. If in fact the person is viewing this screen during midday, then there is no adverse consequence. However, if instead the person is exposed to this high CCT light in the twilight or night time, this can be very disruptive to the circadian cycle and create the symptoms of jet lag, or worse, in people who have not traveled at all and who are otherwise healthy. In more minor instance, this exposure may simply manifest in poor sleep, or a lack of energy during the day. In severe instances, the deceptive signal may lead to a partial or complete disruption of vital hormone production, sleep, or other adverse condition. Further, continued long term exposure is thought by some researchers to also be associated with much more serious adverse health impact.

With the relatively more recent advent of Light Emitting Diodes (LEDs) having higher power and light generation capabilities, and the provision of LEDs of various colors and hues, several ingenious artisans have overcome many of the limitations of the prior art in positive and beneficial ways. Two exemplary patents, the teachings and contents which are incorporated herein by reference, disclose dimmable lights that provide simultaneous color temperature change: U.S. Pat. No. 8,633,650 by Sauerlaender, entitled "Dimmable light source with light temperature shift"; and U.S. Pat. No. 7,288,902 by Melanson, entitled "Color variations in a dimmable lighting device with stable color temperature light sources". These two patents provide LEDs having different color emissions, and control the intensity of the different LEDs based upon the extent of dimming. As a result, these lights do emulate the incandescent lights and combustion lights of the prior art much more nearly. As beneficial as these may be, they too have limitation. While the sunset combines both a shift in color temperature to a lower color temperature and a shift in intensity to a lower intensity, the intensity of the light from the sun is often still many times greater than that produced by electric lighting. As a result, the present invention recognizes the desirability of selectively providing an optimum color temperature, independently of requiring a shift in intensity.

Other artisans have recognized the desirability for providing greater control over the characteristics of a light source. Exemplary patents, the teachings and contents which are incorporated herein by reference, include: U.S. Pat. No. 6,016,038 by Mueller et al, entitled "Multicolored LED lighting method and apparatus"; and U.S. Pat. No. 7,845,823 by Mueller et al, entitled "Controlled lighting methods and apparatus". These lighting systems provide an exemplary array of features and capabilities that may be selected, including color temperature and intensity. However, these systems are also very complex. Consequently, cost is prohibitive for some consumers, and complexity of operations is prohibitive for other consumers. Unfortunately, as a result these systems have not achieved the level of commercial success that was anticipated by many.

Recognizing the desirability of control over a lamp, without the need for a separate computing device or smart phone, two additional patents propose the provision of switch control directly into a lamp. These two exemplary patents, the teachings and contents which are incorporated herein by reference, include: U.S. Pat. No. 8,143,807 by Hsieh et al, entitled "Color temperature controller and color temperature control method of light emitting diode"; and U.S. Pat. No. 8,278,827 by Ku et al, entitled "LED lamp". While these inventions alleviate the need for external control apparatus, the controls for these lights are non-standard, and for many persons may generate confusion over how to operate and control the light source.

Further patents and published patent applications seek to incorporate control over LED light characteristics using a prior art wall switch or dimmer apparatus. Exemplary patents, the teachings and contents which are incorporated herein by reference, include: U.S. Pat. No. 8,441,202 by Wilson et al, entitled "Apparatus and method for LED light control"; U.S. Pat. No. 8,736,183 by Chao, entitled "LED driver capable of controlling color/color temperature with a power carrier"; 2012/0242247 by Hartmann et al., entitled "Operation of an LED Luminaire Having a Variable Spectrum"; 2013/0200814 by Chen et al., entitled "LED lighting apparatus and dimming method thereof"; and 2014/0210357 by Yan et al., entitled "Adjusting Color Temperature in a Dimmable LED Lighting System". These artisans present ingenious techniques for controlling various characteristics of the lights directly from a prior art light switch and dimmer. As innovative as these are, they operate with sensitive electronics coupled directly at the line voltage output from the light switch and dimmer, in some cases necessitating the insertion of various opto-isolators, special voltage regulators, and the like. Further, these also necessitate the provision of a custom driver. Unfortunately, there are literally thousands of LED panels, and many different available drivers. While some manufacturers have standardized to particular standard drivers, there are still others that manufacture a driver associated with and in fact required for a single one of their panels. Consequently, these prior inventions are believed to be deficient both from a safety and security perspective, and also from the need to either provide a custom LED panel and driver, thereby limiting these inventions to new production only and no retrofitting, or the need to manufacture and inventory many variants for each distinct LED panel driver, a daunting task at best and financially impractical for many current commercial projects.

Two exemplary patents, the teachings and contents which are incorporated herein by reference, disclose single power switch controlled color change apparatus, but without a dimmer: U.S. Pat. No. 6,685,339 by Daughtry et al, entitled "Sparkle light bulb with controllable memory function"; and U.S. Pat. No. 8,162,517 by Lee, entitled "Lamp".

Another assortment of exemplary patents, the teachings and contents which are incorporated herein by reference, also disclose wall switch controlled lighting modes: U.S. Pat. No. 4,634,957 by Hollaway, entitled "Remotely controlled light flasher"; U.S. Pat. No. 4,695,739 by Pierce, entitled "Multi-function switch-controlled lamp circuit"; U.S. Pat. No. 4,777,384 by Altenhof et al, entitled "Source voltage triggered timer"; U.S. Pat. No. 4,540,984 by Waldman, entitled "Energy saving control circuit for a light switch and a method therefor"; U.S. Pat. No. 5,030,890 by Johnson, entitled "Two terminal incandescent lamp controller"; Re 35,220 by Johnson, entitled "Two terminal controller"; U.S. Pat. No. 6,700,333 by Hirshi et al, entitled "Two-wire appliance power controller"; and U.S. Pat. No. 9,119,245 by Yang, entitled "LED driving system for switched dimming control and dimming method using the same".

Another collection of exemplary patents, the teachings and contents which are incorporated herein by reference, disclose wall switch controlled switching between two light sources: U.S. Pat. No. 4,322,632 by Hart et al, entitled "Remote load selector"; U.S. Pat. No. 4,480,197 by Hollaway, entitled "Multiple load switching circuit"; and U.S. Pat. No. 4,767,968 by Geanous et al, entitled "System for controlling the operation of electrically powered apparatus".

In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is an LED light having at least two LED light sources and power switch controlled color temperature. A line voltage source is an input to a line voltage switch. The line voltage switch has as an output a switched line voltage, and is configured in a first mode to transmit the line voltage source to the switched line voltage output and in a second mode to interrupt transmission of the line voltage from the line voltage source to the switched line voltage output. An LED driver has as an input the switched line voltage and is configured to convert the switched line voltage to a regulated LED power supply output suitable to drive the at least two LED light sources. A feedback circuit has as an input the regulated LED power supply and as an output a time averaged representation of the regulated LED power supply. A monitor has as an input the time averaged representation of the regulated LED power supply and has as an output a mode signal indicating whether the line voltage switch is operating in the first or second mode. A logic circuit has as an input the mode signal and is configured to detect when the mode signal indicates the line voltage switch is operating in the second mode for a time sufficient to be indicative of a demand to switch a Correlated Color Temperature light output from the at least two LED light sources. The logic circuit has as an output a Correlated Color Temperature control signal that changes in value responsive to a detection of the demand to switch the Correlated Color Temperature light output. A regulator circuit has as an input the Correlated Color Temperature control signal and is configured to selectively control a Correlated Color Temperature of the at least two LED light sources responsive to the Correlated Color Temperature control signal.

In a second manifestation, the invention is an LED light having at least two LED light sources and power switch controlled color temperature. A line voltage source is an input to a line voltage switch. The line voltage switch has as an output a switched line voltage, and is configured in a first mode to transmit the line voltage source to the switched line voltage output and in a second mode to interrupt transmission of the line voltage from the line voltage source to the switched line voltage output. An LED driver has as an input the switched line voltage and is configured to convert the switched line voltage to a regulated LED power supply output suitable to drive the at least two LED light sources. A feedback circuit has a pair of resistors in series across the regulated LED power supply that together define a voltage divider, and has a capacitor in parallel with a first one of the resistors, wherein a voltage across the capacitor provides a time averaged representation of the regulated LED power supply. A microprocessor has as an input the time averaged representation of the regulated LED power supply and is configured to detect when the time averaged representation indicates the line voltage switch is operating in the second mode by detecting a voltage amplitude of the time averaged representation of the regulated LED power supply crossing a threshold value. The microprocessor is further configured to detect when the line voltage switch is operating in the second mode for a time sufficient to be indicative of a demand to switch a Correlated Color Temperature light output from the at least two LED light sources, and has as an output a Correlated Color Temperature control signal that changes in value responsive to a detection of the demand to switch the Correlated Color Temperature light output. A DC regulator has as an input the LED driver output and has as an output a suitable voltage to power the microprocessor. The DC regulator further has stored energy sufficient to power the microprocessor for at least a time period that starts with a time of detection of the line voltage switch operating in the second mode and ends with a time of detection of the demand to switch the Correlated Color Temperature light output. A regulator circuit has as an input the Correlated Color Temperature control signal and is configured to selectively control a Correlated Color Temperature of the at least two LED light sources responsive to the Correlated Color Temperature control signal.

In a third manifestation, the invention is a method of switching the combination of an AC line powered LED driver and LED driver powered LED light between two different Correlated Color Temperature values. In accordance with the method, an LED driver output is time averaged. when The time-averaged LED driver output is compared to a threshold value below which the time-averaged LED driver output is indicative of a disruption of AC line power to the AC line powered LED driver. Responsive to the comparing step, if the time-averaged LED driver output drops below the threshold value, this event is detected. Responsive to the detecting step, it is determined whether the time-averaged LED driver output remains below the threshold value for a time sufficient to be indicative of a demand to switch a Correlated Color Temperature light output from the LED driver powered LED light. Responsive to the determining step, the Correlated Color Temperature light output from the LED driver powered LED light is selectively controlled.

OBJECTS OF THE INVENTION

Exemplary embodiments of the present invention solve inadequacies of the prior art by providing a voltage monitor and LED color controller circuit that detects dimmer and switch on/off status based upon the output of the LED driver, instead of the input to the LED driver. This means the present invention is compatible with nearly any existing LED driver or LED driver topology, as long as the driver works with the LED array, while working with an LED driver output that is inherently more filtered and controlled than would be available and provided on the LED driver input side. This in turn greatly reduces the complexity of the system.

In addition, the present invention is designed in one preferred embodiment to turn on in a default mode with a spectrum that is substantially devoid of violet wavelengths and provides only nominal amounts of blue light, to avoid undesirable disruption of circadian rhythm. In other embodiments, various controls may be provided that permit custom light therapy for various purpose and benefit that will be explained in greater detail herein below.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide relatively lower cost illumination that is thereby more readily available to nearly all people, and that is also safely useable by this same collection of people. A second object of the invention is to provide electrical illumination that may be selectively controlled intuitively and with prior art standard controls to provide variations in both intensity and color temperature. Another object of the present invention is to provide a light spectrum that may be controlled in one state to have a spectral emission minimum at 480 nM, to explicitly allow melatonin production. In another alternative state, a spectral emission has a maximum or peak at 480 nM, to explicitly interfere with melatonin production. In another alternative state, the light spectrum preferably has a sharp cut-off so as to be void or substantially muted at wavelengths below approximately 460 nM to avoid risks that might arise from blue light hazard. A further object of the invention is the provision of an optimum color temperature independent of a shift in intensity. Yet another object of the present invention is to provide control of Correlated Color Temperature (CCT) and intensity of a lamp, without the need for a separate computing device or smart phone. An additional object of the invention is providing a voltage monitor and LED color controller circuit that detects dimmer and switch on/off status based upon the output of the LED driver.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
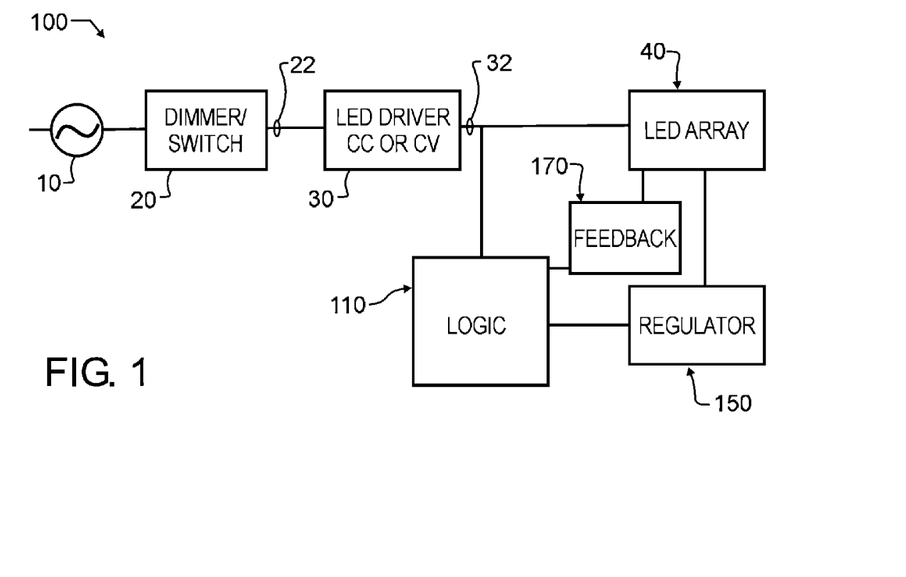
FIG. 1 illustrates a preferred embodiment LED light with power switch controlled color temperature by schematic block diagram.

Manifested in the preferred embodiment LED light with power switch controlled color temperature 100 illustrated in FIG. 1, the present invention provides a voltage monitor and LED color controller circuit that detects upstream dimmer and switch 20 on/off status based upon the output 32 of an LED driver 30. AC power 10 may for exemplary purpose be provided through ordinary house wiring to dimmer and switch 20. Dimmer and switch 20 may be of any appropriate type, but for exemplary purpose dimmer and switch 20 may incorporate a simple single pole, single throw switch such as is commonly used in houses to connect or disconnect power to a light. One such switch of this type is the almost ubiquitous toggle switch. A light dimmer is also most preferably provided as a part of dimmer and switch 20, which may for exemplary purpose comprise a well-known phase angle switch such as an SCR or TRIAC. The output from a prior art dimmer and switch 20 may have the full peak voltage present, but may typically be turned off for some portion of the waveform. Consequently, the output 22 of dimmer and switch 20 is still a high voltage line, and the line may be subject to relatively short duration surges, Electro-Magnetic Interference (EMI) and Radio Frequency Interference (RFI) that is present in AC power 10.

In the prior art incorporated by reference herein above, dimmer and switch 20 status is determined by measurements taken from output 22. In contrast, in the present invention the status of dimmer and switch 20 is determined by measurements that are instead taken at the output 32 of LED driver 30. This provides several important benefits. As noted in FIG. 1, most LED drivers are either designed to provide a Constant Current (CC) to LED array 40, or are designed to provide a Constant Voltage (CV). In either case, the voltage at LED driver output 32 will in most cases already be reduced with respect to dimmer and switch output 22. In addition, undesirable noise may already be attenuated or removed. Logic circuitry 110, which is powered by LED driver output 32, receives feedback on the status of power provided to LED array 40 through feedback circuit 170, and controls LED array 40 through a regulator circuit 150.

Figure 3:
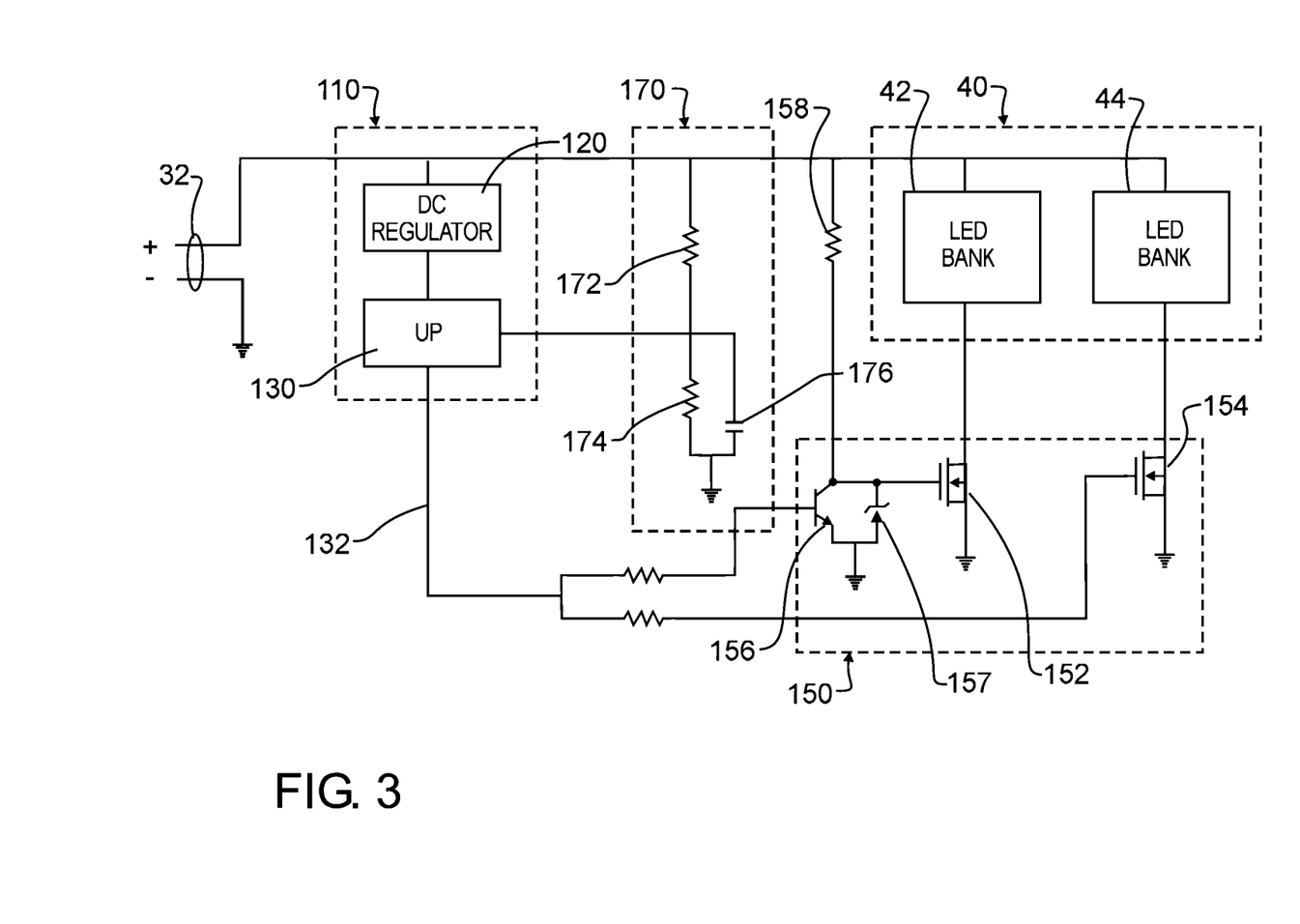
FIG. 3 illustrates various components within the preferred embodiment LED light with power switch controlled color temperature of FIG. 1 in greater detail by schematic diagram.

With reference to FIG. 3, logic circuitry 110 includes a DC regulator 120 and some type of microprocessor 130. While the present specification only generically references microprocessor 130, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

DC regulator 120 may preferably ensure that microprocessor 130 is supplied with a suitable voltage, independent of the voltage of output 32. However, in addition to voltage regulation, DC regulator 120 will also most preferably be provided with significant energy storage capability as well. While in the preferred embodiment this is accomplished through the inclusion of a large capacitor, many different techniques of providing short term energy storage are known in the electrical arts and will be considered to be incorporated herein. The importance of this short term energy storage will be described shortly.

Feedback regarding the status of dimmer and switch 20 and LED array 40 is obtained through feedback circuit 170, which may for exemplary purposes include a pair of resistors 172, 174 and a capacitor 176 that together define both a voltage divider and at least one RC time constant. In the event dimmer and switch 20 is switched off, so that there is no effective voltage at the output 22 therefrom, then the voltage at the output 32 of LED driver 30 will also begin to decay. Provided DC regulator 120 has provision for sufficient short term energy storage to maintain power to microprocessor 130, then microprocessor 130 can monitor the voltage at the junction between capacitor 176, resistor 172, and resistor 174. If this voltage decays for a predetermined time interval indicative of a lack of voltage in the output 32 of LED driver 30, then microprocessor 130 may interpret this voltage drop to be indicative of the switch within dimmer and switch 20 having been opened. If the voltage decays for that predetermined time interval, and then power is restored prior to the short term energy storage within DC regulator 120 becoming inadequate, then microprocessor 130 can interpret this to be a signal requesting a change in CCT output from LED array 40. Note then that the minimum time required for microprocessor 130 to detect an opening in dimmer and switch 20 will be determined by a combination of the RC time constant formed by resistors 172, 174 and capacitor 176, and also by the detectable or selected voltage change across capacitor 176 that microprocessor 130 is set for.

As already noted herein above, there are many different types of microprocessors, microcontrollers, digital signal processors, and the like. Some of these are provided with more than one bit analog to digital converters that can measure smaller voltage changes. At a minimum, an ordinary digital input to a microprocessor is, in effect, a one bit analog to digital converter. A voltage above a threshold will be interpreted by the input as a binary "1", while a voltage below a threshold will be interpreted as a binary "0". Consequently, at whatever threshold the binary input uses to detect a "0" input, then that threshold will be the threshold voltage that the voltage across capacitor 176 must drop to before microprocessor 130 detects the voltage change.

In some microprocessors, the threshold voltage for the input being detected as switching from a "0" to a "1" and for switching from a "1" to a "0" is the same, and is at one-half of the voltage powering the microprocessor. In this specific instance then, the threshold voltage would be at one-half of the supply voltage to the microprocessor.

In addition to the amount of voltage decay that the microprocessor can resolve, there are other considerations for the selection of the minimum time that is required to signal that dimmer and switch 20 has been disconnected. Many LED drivers use various forms of pulse modulation to control brightness levels. This means that the output 32 of LED driver 30 may relatively rapidly, typically many times per second, switch from full voltage to zero voltage. If the threshold voltage used to determine whether dimmer and switch 20 had been activated was taken as the raw signal directly from output 32, or in other words if output 32 were fed directly to the threshold detector of microprocessor 130, such as the digital input discussed above, then microprocessor 130 would incorrectly interpret that dimmer and switch 200 was being disconnected many times each second, at the rate of the pules being output by LED driver 30. In addition, any EMI/RFI noise induced in the LED driver and logic circuitry wiring might also falsely be interpreted as a threshold crossing. A time averaged value for the LED driver regulated output voltage can be used to eliminate false detection of a slowest anticipated pulse modulation rate and also eliminate false detections due to the relatively minor EMI/RFI noise spikes that could reasonably be induced in the LED driver and logic circuitry wiring. Consequently, in the preferred embodiment an RC time constant formed by resistors 172, 174 and capacitor 176 that is sufficiently long eliminates both of these false detections. Nevertheless, it will be apparent that other apparatus and techniques that provide this time averaged value, including both software averaging of the input signal and averaging produced by other known circuits, will be understood to be incorporated herein.

Noteworthy here is that most LED drivers will isolate the LED array wiring, and therefore the logic circuitry, from the very common AC power line noise. Also, for most installations the wiring between the LED driver and LED array is also far shorter than typical AC power line runs. Consequently, both of these combine to greatly reduce the exposure of the LED driver and logic circuitry wiring to EMI/RFI noise compared to that found on a standard AC power line.

Figure 7:
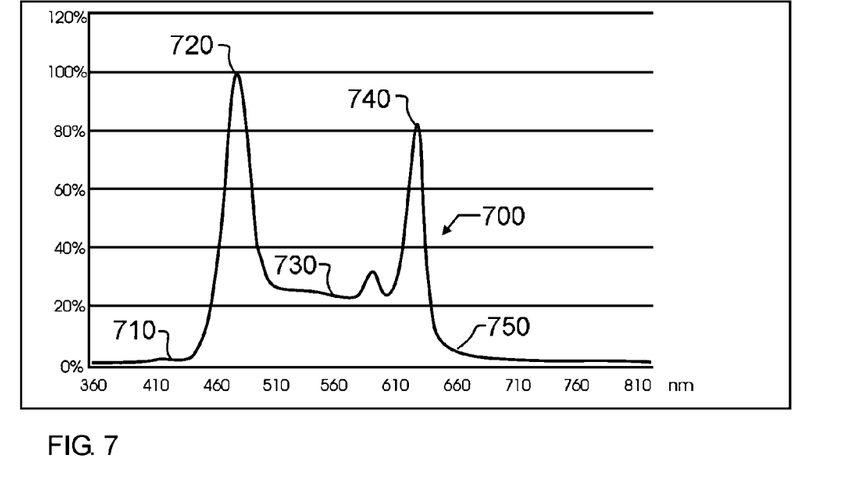
FIG. 7 illustrates an exemplary graph of radiance plotted against wavelength for circuitry such as illustrated in FIG. 3 at one CCT value.
Figure 8:
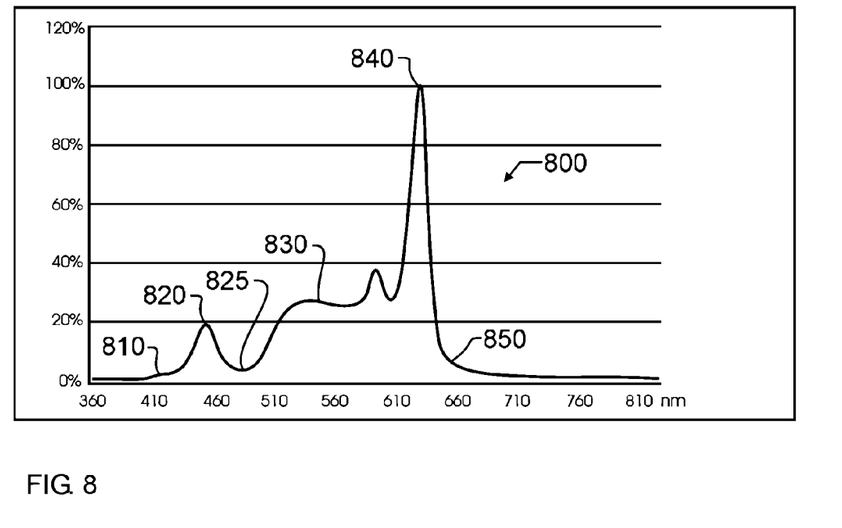
FIG. 8 illustrates an exemplary graph of radiance plotted against wavelength for circuitry such as illustrated in FIG. 3 at a second CCT value different from that of FIG. 7.

Limiting the maximum off time that can be detected is the amount of energy storage within DC regulator 120. Desirably, this is not infinite, but instead measured in the preferred embodiment in some number of seconds. Consequently, if a person were to turn off the switch at dimmer and switch 20 and walk away, in accord with the teachings of the preferred embodiment if they were to return in a few minutes and turn the light switch back on, the energy storage at DC regulator 120 will most preferably be exhausted, causing logic circuitry 110 to return to the default CCT value. This might, again only for exemplary and non-limiting purposes, be a 2,700 degree CCT such as illustrated in FIG. 8. If instead, a person were to turn off the light switch in dimmer and switch 20 for only a few seconds and then turn the switch back on, preferably this will be short enough for logic circuitry 110 to remain active, and this will then be considered to be a command or gesture indicative of a desire to switch to a second CCT value. This second CCT value might, for exemplary and non-limiting purpose, be a 5,000 degree Kelvin CCT such as illustrated in FIG. 7.

While in the preferred embodiment LED light with power switch controlled color temperature 100 the DC regulator 120 energy storage may, for exemplary purposes, be achieved with a large capacitance, in an alternative embodiment contemplated herein, a back-up battery or equivalent may instead be provided. In this case, the DC regulator will continue to power microprocessor 130 for a very long time. However, in this alternative embodiment, a maximum off time that will be detected as still being considered to be a command or gesture indicative of a desire to switch to a different CCT value will instead be set within microprocessor 130 and associated software and hardware. For exemplary and non-limiting purposes, this maximum time might be set to a particular number of seconds or processor cycles, beyond which logic circuitry 110 will return to the default CCT value.

Returning again to FIG. 3, LED array 40 may, for exemplary and non-limiting purpose, be comprised by two different LED Banks 42, 44. In this embodiment, regulator 150 may be comprised by two electronic switches, such as provided by MOSFET 152 and MOSFET 154. A transistor 156, Zener diode 157, and resistor 158 together form an inverter, so that when MOSFET 152 is conducting, MOSFET 154 will not be conducting, and vice-versa. Therefore, when a command or gesture indicative of a desire to switch the CCT value is detected by logic circuitry 110, the voltage at output 132 of microprocessor 130 will be switched to reverse which one of MOSFETs 152, 154 are conducting. While FIG. 3 illustrates a preferred regulator 150, it will be appreciated that many alternative regulators are known to those reasonably skilled in the art, and such regulators will be considered to be incorporated herein as alternatives to that illustrated in FIG. 3.

The LED banks 42, 44 may have different CCT values, different spectral distributions, or both. The CCT of a single bank may be formed from any suitable variety of LED source lights, and so can include all LEDs having a single CCT, or alternatively a mix of LEDs of different CCT values that together define a distinct CCT. For exemplary and non-limiting purpose, LED bank 42 might be comprised of LEDs that each individually have a CCT of 2,700 degrees Kelvin. In this case, then the light output from LED bank 42 would also have a CCT of 2,700 degrees Kelvin. Alternatively, the LEDs within LED bank 42 might for exemplary purposes include two LEDs with a CCT of 2,200 degrees Kelvin, an LED with a CCT of 3,000 degrees Kelvin, and an LED with a CCT of 3,500 degrees Kelvin, where the combination of these four LEDs yields a CCT for LED bank 42 of 2,700 degrees Kelvin. The particular arrangements of LEDs required or desired for a particular CCT and a desired spectral distribution will be determined by a circuit designer after having reviewed the contents provided herein.

Figure 5:
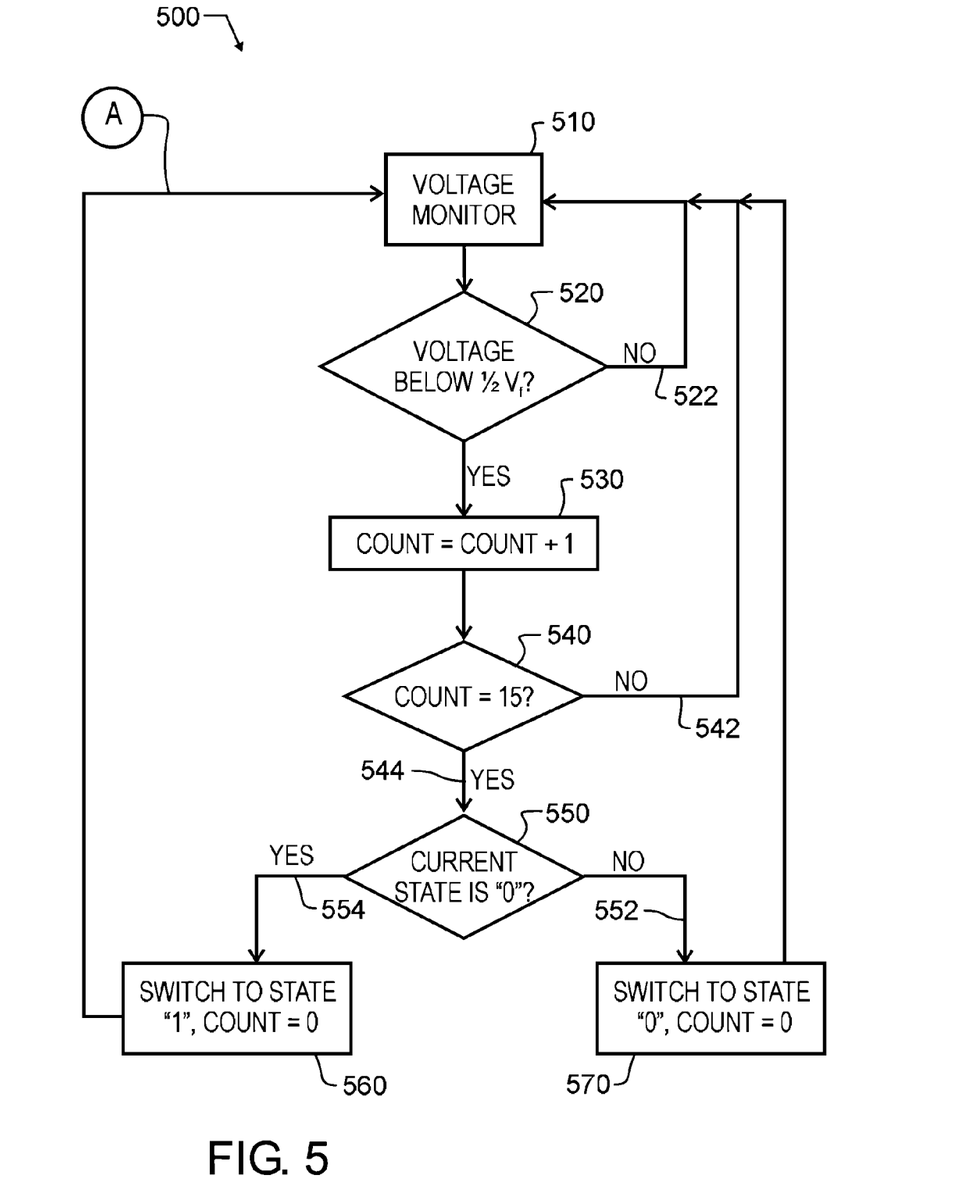
FIG. 5 illustrates a preferred method of switching between two different CCT values by flow chart.

FIG. 5 illustrates a preferred method 500 of switching between two different CCT values. The steps of the methods and algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

As illustrated therein, microprocessor 130 will monitor the voltage at the junction between capacitor 176 and resistors 172, 174 at step 510. For exemplary purposes, the threshold value will be set to be ½ of the ordinary full voltage $V_f$. If the voltage has not dropped to half of full voltage $V_f$, then at step 522 control returns to monitoring the voltage at step 510. If the voltage is in fact now at 50% of full value, then at step 530 a counter simply referred to as COUNT is incremented. COUNT is initialized at a suitable value such as zero, though other initial values may be selected as desired. At step 540, microprocessor 54 will decide whether COUNT is now equal to 15. If not, then at step 542 microprocessor 130 will once again return to step 510 and monitor voltage. However, if COUNT has been incremented 15 previous times and so is now equal to 15, then at step 550 microprocessor 130 will determine whether the current state is 0, which designates an initial start-up default CCT, or if instead the current state is 1. If the current state is 0, then the current state will be switched to 1 at step 560, and microprocessor 130 will once again monitor the voltage across capacitor 176 at step 510. Also in step 560, COUNT will be reset to zero. If instead the current state is 1, then at step 570 state will be switched to 0, COUNT will be reset to zero, and microprocessor 130 will once again monitor the voltage across capacitor 176 at step 510.

The particular value for COUNT to equal at step 540 will be determined by a designer familiar with the teachings of the present invention. This value determines how many times steps 510, 520, 530 and 540 must be executed before enough time has elapsed for the preferred method 500 of switching between two different CCT values to be indicative of a gesture requesting that the CCT of LED array 40 be changed. Consequently, factors such as the speed of logic circuitry 110 and the desired time to elapse must all be considered. As may be apparent then, the value for COUNT to equal at step 540 may vary widely with changes in the speed of logic circuitry 110.

The current state will be understood to be a binary representation representing the level at output 132, either being a low value (state 0) or a high value (state 1). As discussed above, when this output 132 switches from low to high or high to low, then which one of MOSFETs 152, 154 is conductive will also switch, thereby switching which LED bank 42 or 44 is powered and generating light.

Figure 6:
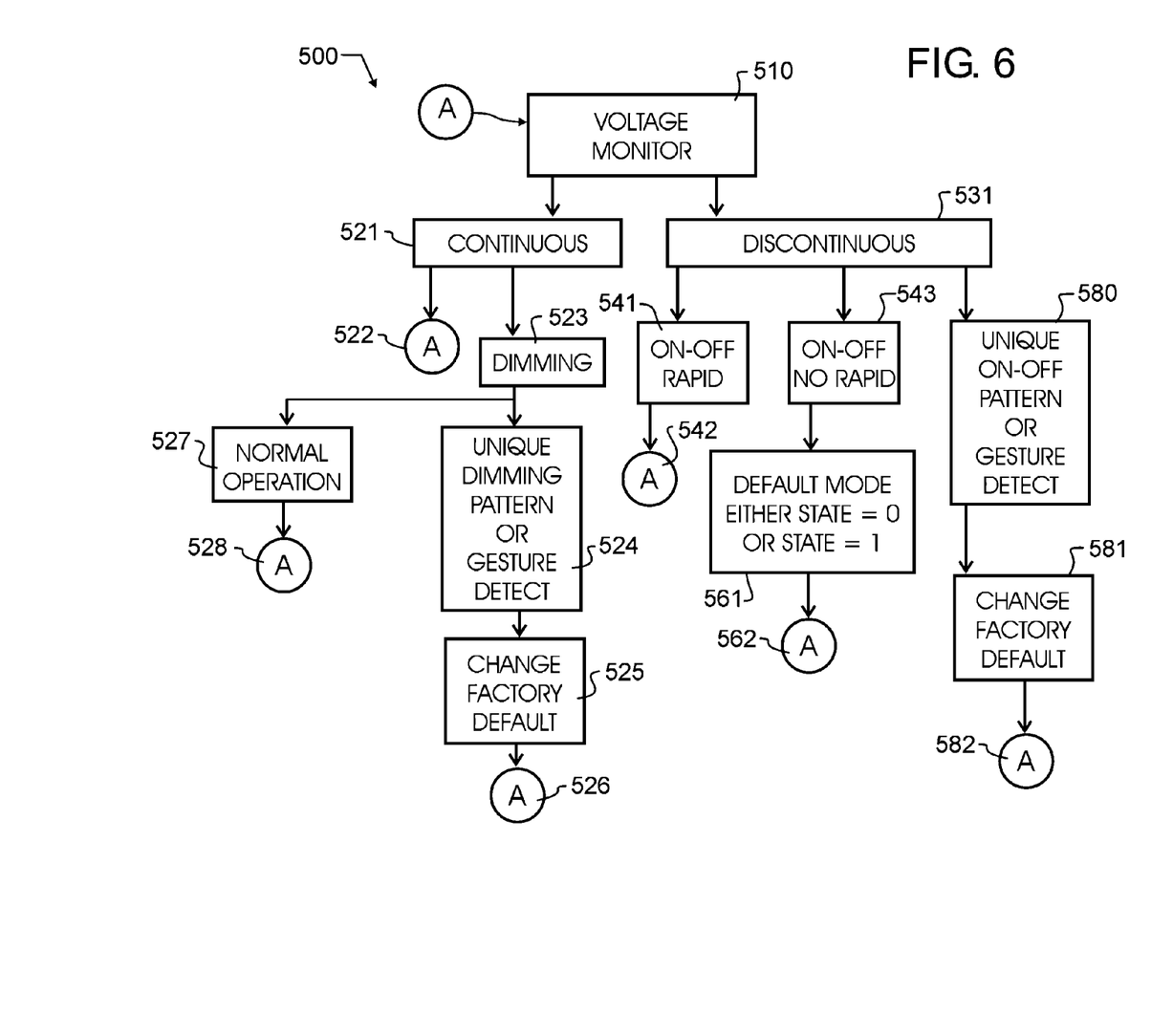
FIG. 6 illustrates the preferred method of switching between two different CCT values of FIG. 5 by slightly different flow chart.

FIG. 6 illustrates this preferred method 500 of switching between two different CCT values of FIG. 5 by slightly different flow chart and organization, and having additional features illustrated. As shown therein, step 510 is the monitoring by microprocessor 130 of the voltage across capacitor 176. If there is a discontinuity in the voltage, such as a short drop in the voltage indicative of a disconnecting at dimmer and switch 20, then the nature of the disconnect may be determined. If the switching is too rapid, as illustrated at step 541, then this is presumed to be either contact bounce or inadvertent, unintentional interruption. In this case, the process will return through step 542 back and monitoring will again continue at step 510, with no other change being made. If instead, the discontinuity is for a substantial period of time, as shown by step 543, then the short term power stored in DC regulator 120 will be dissipated, and microprocessor 130 will lose power. Upon restarting, the output 132 of microprocessor 130 will reset to the default mode state. However, if the switching is of the intermediate timing, this will be considered to be a gesture requesting a CCT value change, and so the state will be changed at step 581. Microprocessor procedural operations will then return through step 582 back to monitoring the voltage at step 510.

If instead of a discontinuous voltage, indicative of a light switch being turned off, the voltage is maintained in a continuous manner at step 521, and if there is no indication of a change in intensity, then this voltage monitoring at step 510 continues indefinitely by simply cycling back through step 522 to voltage monitoring step 510. However, if a dimming is detected at step 523, then the nature of the dimming may also be monitored and determined.

The present invention recognizes that, in some existing configurations, an on-offlight switch is not available. In such case, a particular intensity level or dimming regulation may instead be used to effect control of CCT default value. For exemplary purposes, and not solely limiting the invention thereto, after dimming is detected at step 523, then the nature of the dimming will be determined. If the dimming is a simple and normal change from one illumination intensity to another as shown at step 527, then procedural operations will return through step 528 back to voltage monitoring at step 510. However, if instead there is a unique dimming pattern or gesture detected at step 524, such as for exemplary purposes a definitive cycling through a full or nearly full dimming and then rapidly back to a full brightness, or through two such cycles, then this may also or alternatively be used to change the appropriate factory default setting, as shown at step 525. Once the factory default has been changed, then process will continue through step 526 back to voltage monitoring at step 510.

Figure 2:
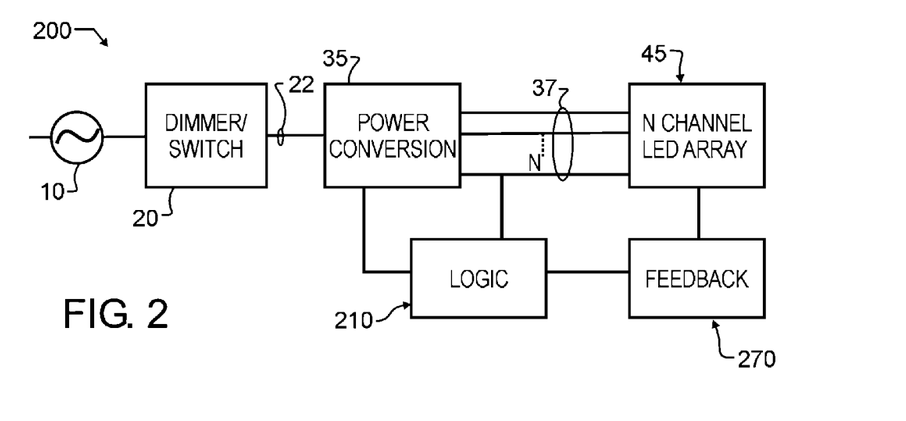
FIG. 2 illustrates a first alternative embodiment LED light with power switch controlled color temperature by schematic block diagram.
Figure 4:
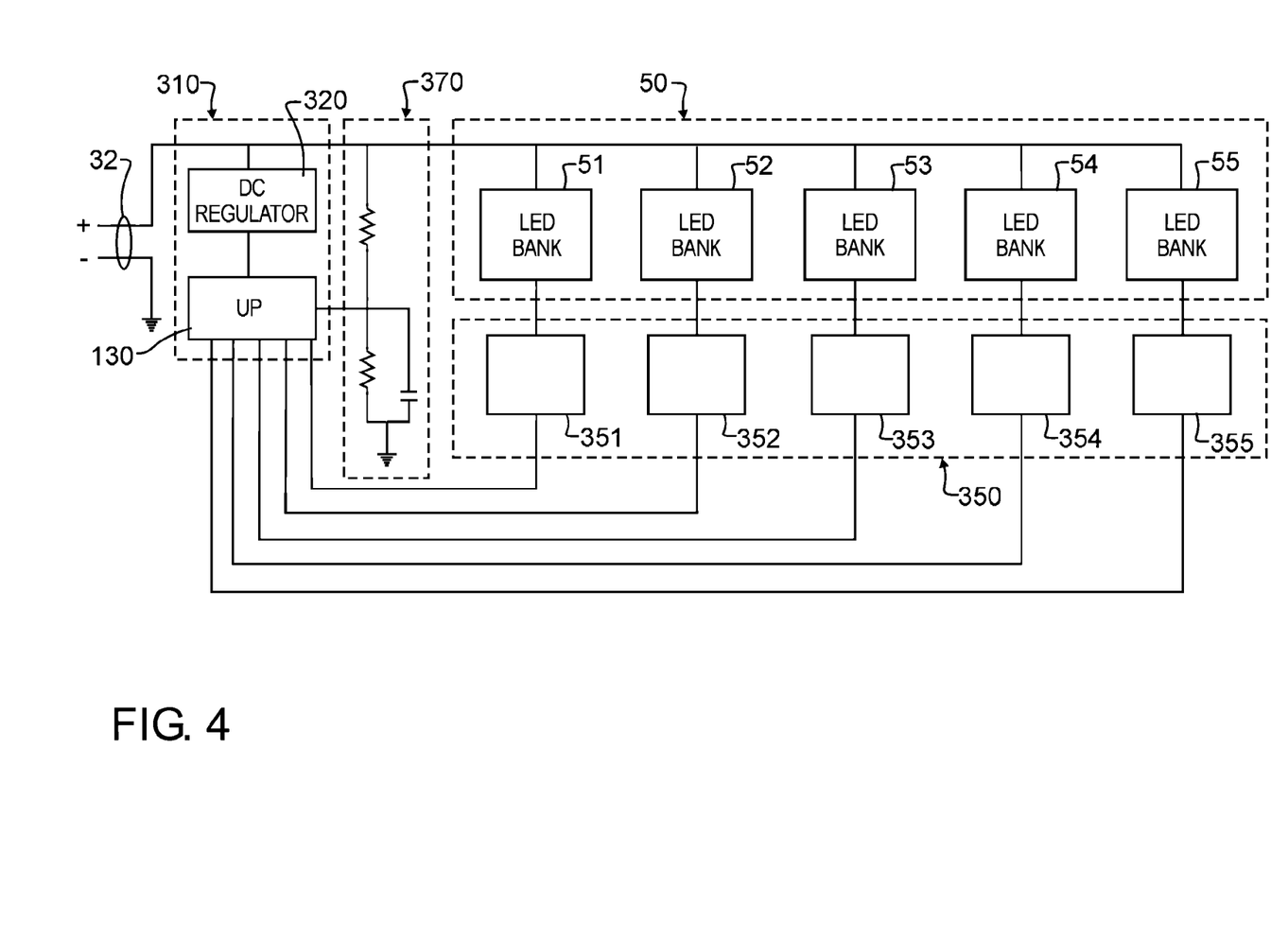
FIG. 4 illustrates various components within a second alternative embodiment LED light with power switch controlled color temperature similar to that of FIG. 3 by schematic diagram.

Three different embodiments of apparatus designed in accord with the present invention have been illustrated in the various FIGS. 1, 2, and 4. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

FIG. 2 illustrates a first alternative embodiment LED light with power switch controlled color temperature 200. In this embodiment, LED array 45 may be a multi-channel array that may be driven by the well-known four channel drivers that include a common as one output, and three RGB output lines. While a four channel driver is described, it will be apparent to those skilled in the art that any number of channels may be used, and so the output 37 of power conversion circuitry 35 is simply identified as an N-channel output, connected to an N-channel LED array 45. While feedback circuitry 270 may be designed to be functionally similar, there will either need to be N feedback circuits 270 resembling feedback circuit 170, with one feedback circuit 270 for each channel and each of these feedback circuits monitored by the microprocessor, or there will need to be either a diode or resistor array that can provide current to a capacitor similar to capacitor 176, so that a single capacitor 176 might be used to monitor all channels before presuming that dimmer and switch 20 has been opened. Also, since power conversion circuitry 35 provides output control for each channel, the output from logic circuitry 210 will preferably be used as input into power conversion circuitry 35 rather than trying to add regulators for each of the N channels. Nevertheless, in an alternative embodiment, logic circuitry 210 may be used to control additional regulators for each of the N channels.

FIG. 4 illustrates various components within a second alternative embodiment LED light with power switch controlled color temperature 300 similar to that of light 200 of FIG. 3. However, in this embodiment microprocessor 330 is in fact controlling a plurality of LED regulators or drivers 351-355 that each are used to control the power delivered to an associated LED bank 51-55. This increase in the number of LED banks allows much more precise and specific control over the shape of the curve of radiance plotted against wavelength, and therefore allows the apparatus to create an essentially infinite number of CCT values and plot geometries.

Because resistors 172, 174 of feedback circuit 170 define a voltage divider, microprocessor 130 may be used to monitor a wide range of voltages at output 32 of LED driver 30 that may conceivably be greater than that supplied to microprocessor 130 by DC regulator 120. As may be apparent then, this means the present invention is compatible with nearly any existing LED driver or LED driver topology, as long as the driver works with the LED array. Preferred embodiments of the invention work with an LED driver output that is inherently more filtered and controlled than would be available and provided on the LED driver input side. This in turn greatly reduces the complexity of the system.

Various embodiments of the present invention are contemplated to be used in conjunction with the following exemplary drivers, though not limited solely thereto, including: phase controls such as TRIAC and reverse phase controls; 0-10V controls; control other than 0-10V or phase; wireless or wired types; "if this than that" type logic controls, and scene play controls.

Figure 9:
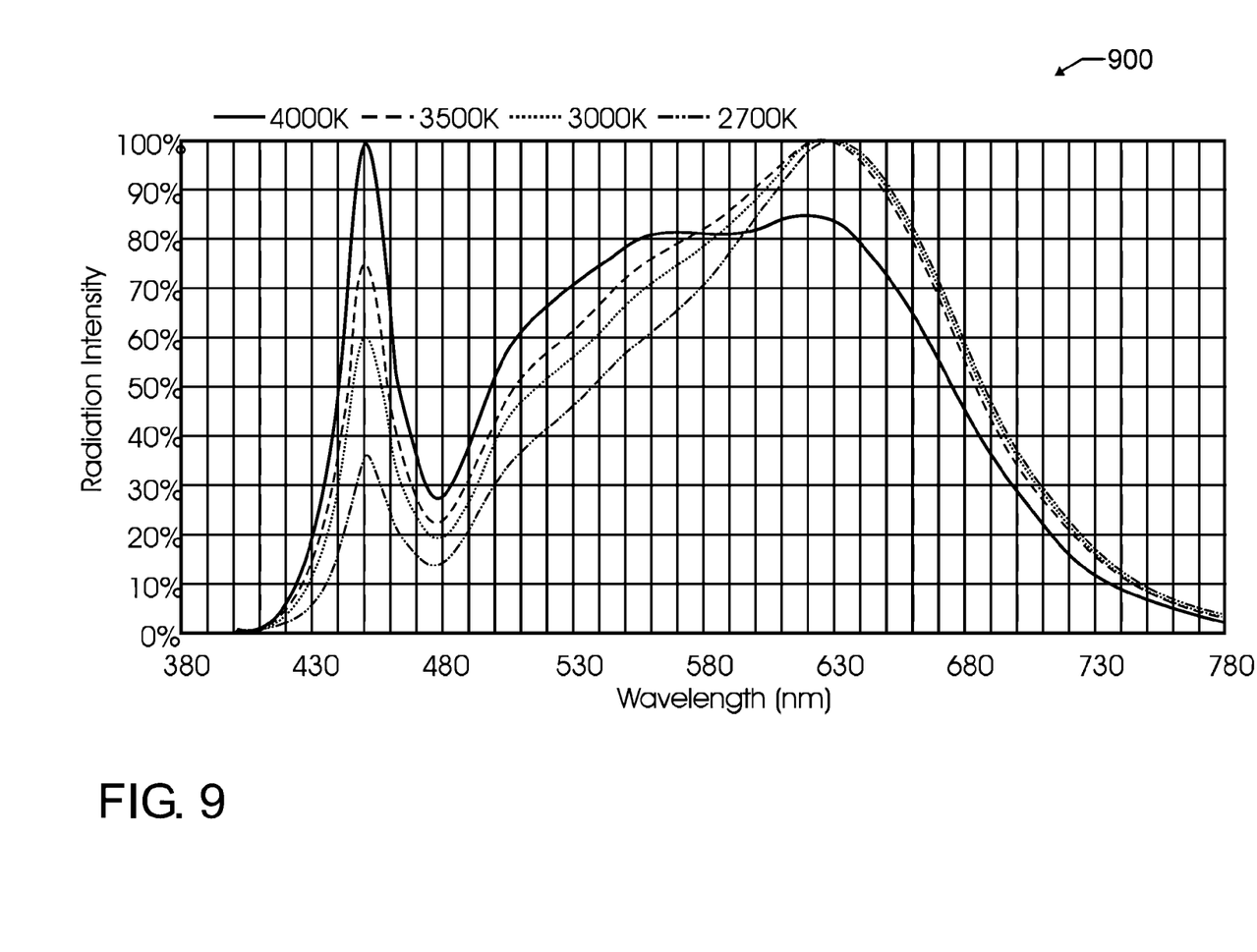
FIG. 9 illustrates an exemplary graph of radiance plotted against wavelength for circuitry such as illustrated in FIG. 4, showing four different non-simultaneous CCT values.

FIG. 9 illustrates an exemplary graph 900 of radiance plotted against wavelength for circuitry such as illustrated in FIG. 4, showing four different non-simultaneous CCT values of 2,700 degrees Kelvin, 3,000 degrees Kelvin, 3,500 degrees Kelvin, and 4,000 degrees Kelvin. The activation and selection of each one of these four different plots might for exemplary purposes be four gestures or activations of wall dimmer and switch 20, with each activation stepping to the next CCT value. In another alternative embodiment, a single gesture or activation of wall dimmer and switch 20 may be used to initiate a time-dispersed step through the different non-simultaneous CCT values to create the impression of a more gradual transition. In other words, and for exemplary but non-limiting purposes, a time interval may be chosen such as at five minute intervals, the CCT value of emitted light may switch to the next CCT value. With four spectral distributions such as illustrated in FIG. 9, over a ten minute interval the transition might be completed. This is accomplished by switching immediately to the next value from the first at the time of switching, then waiting five minutes and switching to the third value, and then waiting again for five minutes and switching to the fourth value. It should be apparent that the amount of delay may be factory preset, or may also be set through a unique user gesture or command provided through wall dimmer and switch 20. While four distinct spectral distributions are shown in FIG. 9, each representing a different CCT value, it will be apparent that any number of CCT values may be provided, as determined by a designer or engineer during the design of an embodiment of the present invention.

One feature that all of the spectral distributions plotted in FIG. 9 have in common is a spectral minimum at approximately 480 nanometers. For many of the embodiments described herein, this minimum is considered to be an important feature, to explicitly allow melatonin production in those exposed to light from embodiments of the present invention. The CCT may still shift from the warm glow of 2,700 degrees Kelvin to the cooler daylight of 4,000 degrees Kelvin to suit the preferences of a person, but without unknowingly interfering with melatonin production. A preferred light as incorporated in the FIG. 9 spectral emissions will therefore not interfere with the Circadian Cycle in any way.

The present invention is designed in preferred embodiment LED light with power switch controlled color temperature 100 to turn on in a default mode with a spectrum 800 illustrated in FIG. 8 that is substantially devoid of violet wavelengths 810 and provides only nominal amounts of blue light 820, to avoid undesirable disruption of circadian rhythm. Just as with FIG. 9 described above, a local minimum is provided at approximately 480 nM, which ensures melatonin production will occur uninhibited. The primary spectral energy is found in the red band at peak 840, with only modest amounts of spectral energy in the green band 830 as well. For the efficient generation of visible light, with a minimum of wasted thermal energy, a cut-off 850 may be provided at any desired and opportune wavelength in the red band.

If a person should desire light more closely resembling that of daylight, a simple flip of the wall switch to the off position, followed by a short delay on the order of one or a few seconds, followed again by a flip of the wall switch to the on position, will cause preferred embodiment LED light with power switch controlled color temperature 100 to turn on with the second CCT, with a spectrum 700 such as illustrated in FIG. 7. As clearly contrasted between FIGS. 7 and 8, the 5,000 degree Kelvin CCT of FIG. 7 may for exemplary purposes includes a strong blue peak approximately at 480 nanometers. This peak is explicitly chosen to inhibit melatonin production, and thereby maintain the human circadian rhythm, just as would occur during mid-day sunlight exposure. This peak is selected to enhance focus and productivity. However, preferably and in accord with the teachings of preserving and protecting human eyesight and avoiding blue light hazard, preferred embodiment LED light with power switch controlled color temperature 100 still retains an almost non-existent spectral energy in violet region 710. The remaining points 730, 740, and 750 are similar to those of FIG. 8, though not identical thereto.

In other embodiments such as second alternative embodiment LED light with power switch controlled color temperature 300 illustrated in FIG. 4, various controls may be provided that permit custom light therapy for various purpose and benefit. In each of the embodiments, the following may preferably be controlled: CCT; intensity; spectral stimulation; and spectral enhancement. As a result, various preferred and alternative embodiments of the present invention may be used for various functions, including though not limited solely thereto: control over and protection of the human circadian rhythm; personalized spectrums for individual therapies that might include medical therapies or light prescriptions for purposes that might include but are not limited to treatment of jet lag and day and night synchronization; plant and agricultural treatments; treatments for poultry and other animals; day light simulation that might include the recording and play black of any desired daylight sky for any part of the world; the presentation of real-time desired daylight sky for any part of the world; generation of a low optical damage spectral profile; generation of a low material degradation spectral profile; and for educational purposes to enhance learning.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. An LED light with power switch controlled color temperature, comprising:
   a line voltage source;
   a line voltage switch having as an input said line voltage source and having as an output a switched line voltage, said line voltage switch configured in a first mode to transmit said line voltage source to said switched line voltage output and in a second mode to completely interrupt transmission of said line voltage from said line voltage source to said switched line voltage output;
   at least two LED light sources;
   an LED driver having as an input said switched line voltage and having as an output a regulated LED power supply suitable to drive said at least two LED light sources, said LED driver configured to convert said switched line voltage to said regulated LED power supply output;
   a feedback circuit having as an input said regulated LED power supply and as an output a time averaged representation of said regulated LED power supply;
   a monitor having as an input said time averaged representation of said regulated LED power supply and having as an output a mode signal indicating whether said line voltage switch is operating in said first mode or said second mode;
   a logic circuit having as an input said mode signal and configured to detect when said mode signal indicates said line voltage switch is operating in said second mode for a time sufficient to be indicative of a demand to switch a Correlated Color Temperature light output from said at least two LED light sources and having as an output a Correlated Color Temperature control signal that changes in value responsive to a detection of said demand to switch said Correlated Color Temperature light output; and
   a regulator circuit having as an input said Correlated Color Temperature control signal and configured to selectively control a Correlated Color Temperature of said at least two LED light sources responsive to said Correlated Color Temperature control signal.

2. The LED light with power switch controlled color temperature of claim 1, wherein said LED driver is configured to provide at least one of a constant current output and a constant voltage output.

3. The LED light with power switch controlled color temperature of claim 1, wherein said feedback circuit further comprises at least one resistor and a capacitor that together define an RC time constant.

4. The LED light with power switch controlled color temperature of claim 3, wherein said at least one resistor further comprises a pair of resistors that together define a voltage divider.

5. The LED light with power switch controlled color temperature of claim 1, wherein said monitor is configured to generate said mode signal indicative of said line voltage switch operating in said second mode based upon said time averaged representation of said regulated LED power supply crossing a threshold value.

6. The LED light with power switch controlled color temperature of claim 1, wherein said monitor further comprises a voltage monitor, and said monitor is configured to generate said mode signal indicative of said line voltage switch operating in said second mode based upon a voltage amplitude of said time averaged representation of said regulated LED power supply crossing a threshold value.

7. The LED light with power switch controlled color temperature of claim 1, wherein said logic circuit is powered by said LED driver output.

8. The LED light with power switch controlled color temperature of claim 1, wherein said logic circuitry further comprises a microprocessor and a DC regulator, said DC regulator having as an input said LED driver output and having as an output a suitable voltage to power said microprocessor.

9. The LED light with power switch controlled color temperature of claim 8, wherein said DC regulator further comprises energy storage capability sufficient to power said microprocessor for a time period greater than a time period that starts with a time of detection of said line voltage switch operating in said second mode and ends with a time of detection of said demand to switch said Correlated Color Temperature light output.

10. The LED light with power switch controlled color temperature of claim 1, wherein said logic circuitry is configured to generate a default Correlated Color Temperature control signal on start-up that selectively controls said at least two LED light sources to generate a light output substantially devoid of violet and shorter wavelengths.

11. An LED light with power switch controlled Correlated Color Temperature, comprising:
   a line voltage source;
   a line voltage switch having as an input said line voltage source and having as an output a switched line voltage, said line voltage switch configured in a first mode to transmit said line voltage source to said switched line voltage output and in a second mode to interrupt transmission of said line voltage from said line voltage source to said switched line voltage output;
   at least two LED light sources;
   an LED driver having as an input said switched line voltage and having as an output a regulated LED power supply providing at least one of a constant current output and a constant voltage output suitable to drive said at least two LED light sources, said LED driver configured to convert said switched line voltage to said regulated LED power supply output;

a feedback circuit having a pair of resistors in series across said regulated LED power supply that together define a voltage divider, and having a capacitor in parallel with a first one of said resistors, wherein a voltage across said capacitor provides a time averaged representation of said regulated LED power supply;

a microprocessor having as an input said time averaged representation of said regulated LED power supply and configured to detect when said time averaged representation indicates said line voltage switch is operating in said second mode by detecting a voltage amplitude of said time averaged representation of said regulated LED power supply crossing a threshold value, and further configured to detect when said line voltage switch is operating in said second mode for a time sufficient to be indicative of a demand to switch a Correlated Color Temperature light output from said at least two LED light sources, and having as an output a Correlated Color Temperature control signal that changes in value responsive to a detection of said demand to switch said Correlated Color Temperature light output;

a DC regulator having as an input said LED driver output and having as an output a suitable voltage to power said microprocessor, said DC regulator further having stored energy sufficient to power said microprocessor for at least a time period that starts with a time of detection of said line voltage switch operating in said second mode and ends with a time of detection of said demand to switch said Correlated Color Temperature light output; and a regulator circuit having as an input said Correlated Color Temperature control signal and configured to selectively control a Correlated Color Temperature of said at least two LED light sources responsive to said Correlated Color Temperature control signal.

12. The LED light with power switch controlled Correlated Color Temperature of claim 11, wherein said logic circuitry is configured to generate a default Correlated Color Temperature control signal on start-up that selectively controls said at least two LED light sources to generate a light output substantially devoid of violet and shorter wavelengths.

13. The LED light with power switch controlled Correlated Color Temperature of claim 11, wherein said at least two LED light sources further comprise a first LED light bank having a first Correlated Color Temperature and second LED light bank having a second Correlated Color Temperature, and wherein said Correlated Color Temperature control signal comprises a binary signal, and wherein said regulator circuit comprises first and second electronic switches, said first electronic switch receiving as an input said Correlated color Temperature control signal without inversion and controlling power to said first LED light bank, said second electronic switch receiving as an input an inverted Correlated Color Temperature control signal and controlling power to said second LED light bank.

14. A method of switching the combination of an AC line powered LED driver and LED driver powered LED light between two different Correlated Color Temperature values, comprising the steps of:

time averaging an LED driver output;

comparing said time-averaged LED driver output to a threshold value below which said time-averaged LED driver output is indicative of a complete interruption of AC line power transmission to said AC line powered LED driver;

detecting when said time-averaged LED driver output drops below said threshold value responsive to said comparing step;

determining responsive to said detecting step whether said time-averaged LED driver output remains below said threshold value for a time sufficient to be indicative of a demand to switch a Correlated Color Temperature light output from said LED driver powered LED light; and selectively controlling said Correlated Color Temperature light output from said LED driver powered LED light responsive to said determining step.

15. The method of switching the combination of an AC line powered LED driver and LED driver powered LED light between two different Correlated Color Temperature values of claim 14, further comprising the steps of:

ascertaining responsive to said detecting step whether said time-averaged LED driver output remains below said threshold value for a time sufficient to be indicative of a demand to reset a Correlated Color Temperature light output from said LED driver powered LED light to a default value; and selecting said Correlated Color Temperature light output from said LED driver powered LED light responsive to said ascertaining step.

16. The method of switching the combination of an AC line powered LED driver and LED driver powered LED light between two different Correlated Color Temperature values of claim 14, further comprising the step of initializing said Correlated Color Temperature light output from said LED driver powered LED light at start-up with a default Correlated Color Temperature light output that has a minimum in the spectral distribution plot at approximately 480 nanometers, to avoid undesirable disruption of circadian rhythm.

17. The method of switching the combination of an AC line powered LED driver and LED driver powered LED light between two different Correlated Color Temperature values of claim 14, wherein said step of selectively controlling further comprises initializing said Correlated Color Temperature light output from said LED driver powered LED light with a default Correlated Color Temperature light output that has a maximum in the spectral distribution plot at approximately 480 nanometers, to thereby simulate midday light melatonin suppression and thereby selectively interact with the human circadian rhythm.

18. The method of switching the combination of an AC line powered LED driver and LED driver powered LED light between two different Correlated Color Temperature values of claim 15, wherein said step of selecting further comprises sequencing through a sequence of preset Correlated Color Temperature values to a next one of said sequence of preset Correlated Color Temperature values.

19. The method of switching the combination of an AC line powered LED driver and LED driver powered LED light between two different Correlated Color Temperature values of claim 14, wherein said step of selectively controlling further comprises switching from a first LED bank to a second LED bank.

20. The method of switching the combination of an AC line powered LED driver and LED driver powered LED light between two different Correlated Color Temperature values of claim 14, further comprising the step of disrupting said AC line power to said AC line powered LED driver by switching a dimmer upstream of said AC line powered LED driver to a highly dimmed setting.

21. The method of switching the combination of an AC line powered LED driver and LED driver powered LED light between two different Correlated Color Temperature values of claim 14, further comprising the steps of:
  identifying when a change in said time-averaged LED driver output is indicative of a gesture requesting to change a default Correlated Color Temperature light output from said LED driver powered LED light; and
  changing said default Correlated Color Temperature light output from said LED driver powered LED light responsive to said identifying step.

22. The method of switching the combination of an AC line powered LED driver and LED driver powered LED light between two different Correlated Color Temperature values of claim 14, wherein said step of selectively controlling further comprises providing said Correlated Color Temperature light output from said LED driver powered LED light with a Correlated Color Temperature light output that has a sharp cut-off of light of shorter wavelengths below 460 nanometers, to avoid blue light hazard.

* * * * *